Aug. 21, 1973  T. J. BLEE  3,753,879
METHOD AND MEANS FOR PRODUCING HOLES
Filed Feb. 3, 1971  3 Sheets-Sheet 1

United States Patent Office 3,753,879
Patented Aug. 21, 1973

3,753,879
METHOD AND MEANS FOR PRODUCING HOLES
Timothy John Blee, Leamington Spa, England, assignor to Associated Engineering Limited, Leamington Spa, Warwickshire, England
Filed Feb. 3, 1971, Ser. No. 112,181
Int. Cl. B01k 3/00; B23p 1/00, 1/02
U.S. Cl. 204—129.2
16 Claims

ABSTRACT OF THE DISCLOSURE

This invention relates to the production, by electrochemical machining, of holes of the required flow characteristics, in workpieces such as injector nozzles of fuel injection equipment. According to this invention, after a hole has been initially formed undersize, it is enlarged by passing therethrough a liquid electrolyte whilst a current flows between the workpiece and a tool associated therewith. The change in flow rate of electrolyte, or the change in pressure drop across the hole, is sensed as the hole is enlarged, and the electrochemical machining is stopped when the flow rate, or pressure drop, reaches a predetermined value.

---

Figure 2:
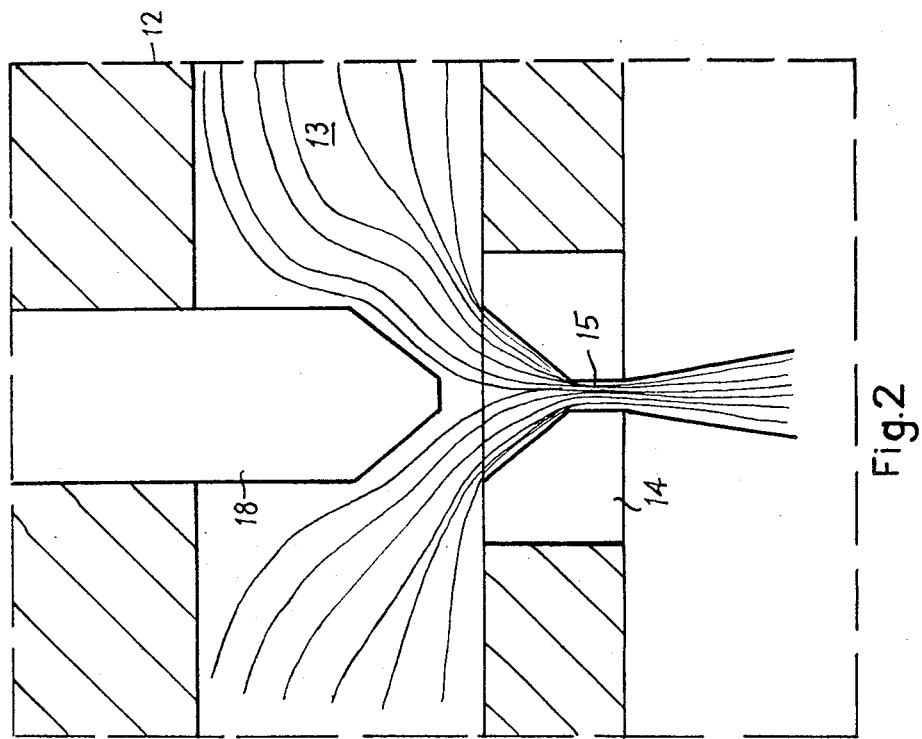

This invention relates to a method of and means for producing holes.

In certain cases, such as for the injector nozzles of fuel injection equipment, it is required to produce, in large quantities, holes of substantially identical fluid flow characteristics, in order that the flow through the different holes shall be the same under a given set of conditions.

Difficulties have been encountered in producing holes of identical flow characteristics by conventional methods, since it is found that the discharge coefficient of, for example, conventional drilled holes of the same diameter is very sensitive to burrs and to variations in the sharpness of the edges of the holes.

According to the present invention in one aspect, a method of producing a hole having required flow characteristics in a workpiece includes the steps of initially forming a hole in the workpiece, and subsequently finishing the hole so as to provide the required fluid flow characteristics by electrolytically removing metal from around the hole whilst passing a flow of an electrolyte through the hole, and terminating the removing of metal when a predetermined value of the flow (or pressure difference) is attained.

From one aspect the present invention provides a method of producing a hole having required flow characteristics in a workpiece, including the steps of initially forming a hole in the workpiece, passing a flow of liquid electrolyte at a controlled pressure difference (or flow rate) through the hole and simultaneously removing metal electrolytically from the workpiece by passing a current between a tool and the workpiece, whereby the flow of electrolyte at a given pressure difference increases (or the pressure difference at a given flow decreases) as the hole is enlarged by said removal of metal, measuring or sensing the rate of flow of electrolyte through the hole (or the pressure difference across the hole), and ceasing to remove metal when a predetermined value of the flow (or pressure difference) is reached.

According to the present invention in another aspect, apparatus for finishing a hole having required flow characteristics in a workpiece includes means for the electrolytic removal of metal from around the hole, means for passing a flow of electrolyte through the hole, and means for terminating the removal of metal when a predetermined value of the flow through (or pressure difference across) the hole is attained.

From another aspect the present invention provides means for producing a hole having required flow characteristics in a workpiece, including means to support a tool and the workpiece in positional relation with the tool opposite a hole initially formed in the workpiece, means to supply an electrolyte to the gap between the tool and workpiece so as to cause the electrolyte to flow through the hole in the workpiece at a controlled pressure difference (or flow rate), means to pass a current between the tool and the workpiece, whereby electrolytically to remove metal from around the hole in said workpiece and thereby to cause the flow of electrolyte through the hole to increase at a given pressure difference (or the pressure difference at a given flow to decrease), and means to measure or sense the rate of flow of electrolyte through the hole (or the pressure difference across the hole) and automatically to stop the removal of metal when a predetermined value of the flow (or pressure difference) is reached.

Figure 1:
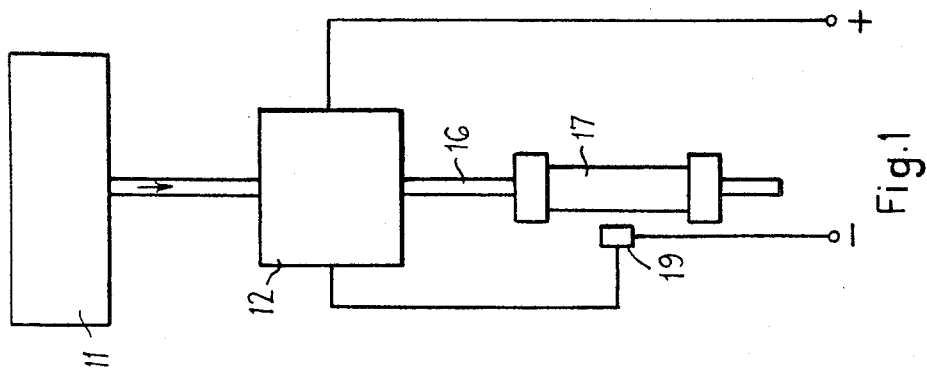
Figure 3:
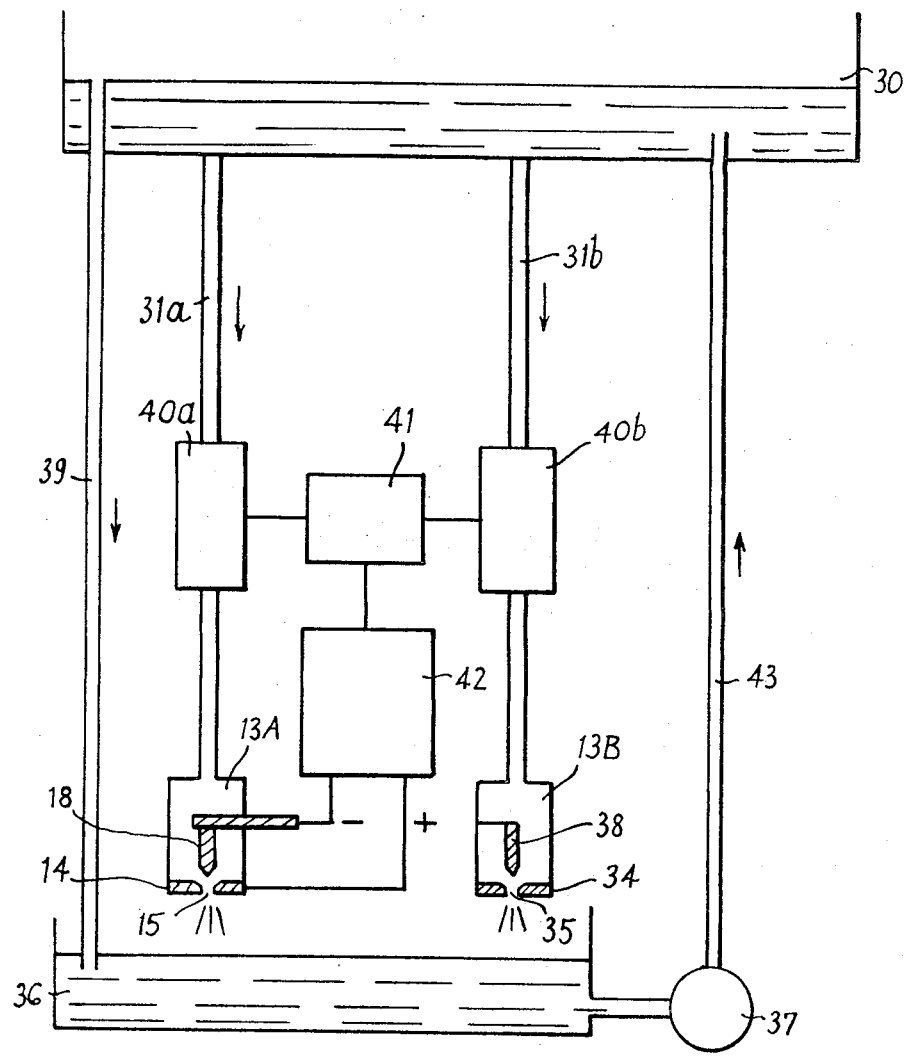
Figure 4:
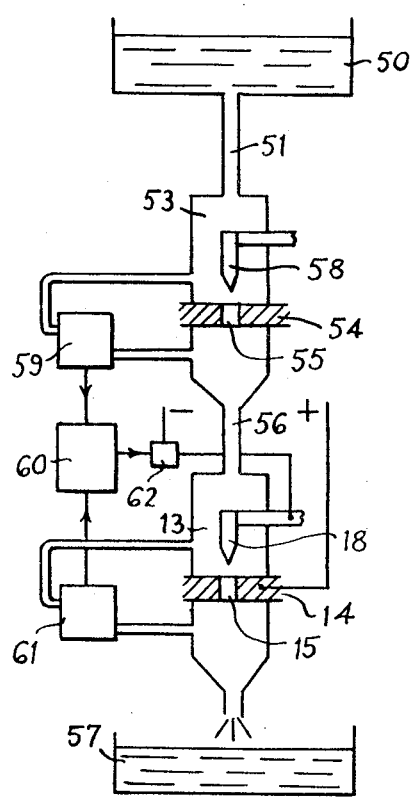

The invention will now be further described by way of example, with reference to the accompanying drawings, in which:

FIG. 1 is a diagrammatic general view of one form of installation in accordance with the invention, FIG. 2 is a detail view, FIG. 3 is a diagrammatic view of a further embodiment, and FIG. 4 is a diagrammatic view of yet another embodiment.

Referring to FIGS. 1 and 2, a flow of electrolyte is supplied from a source 11 to electrochemical machining apparatus 12. This apparatus may be arranged to receive a single workpiece when it will have a single tool, but it is preferred that the apparatus is arranged for the machining of a quantity of workpieces simultaneously. In the latter case the number of tools will be equal to the number of workpieces, and these will be so arranged, either by spacing, or the use of barriers, or otherwise, so that the flow of current between one tool and the corresponding workpiece has substantially no effect on adjacent workpieces.

Part of the apparatus 12 is shown diagrammatically in FIG. 2 and consists of a chamber 13 to which the flow of electrolyte is supplied at a constant pressure. The or each workpiece 14 is positioned in a slot in one wall of the chamber, the workpiece having previously been drilled or otherwise formed with a suitable hole 15. Electrolyte passing through the hole 15 is conveyed through a piping 16 to a flowmeter 17.

Co-operating with each workpiece 14 is a tool 18, and a direct current is passed between the two, the workpiece 14 forming the anode and the tool 18 the cathode. In this way metal is removed from the workpiece 14, enlarging the effective flow area of the hole 15, and thus allowing the rate of flow of electrolyte through the hole to increase. This rate of flow is sensed by the flowmeter 17, and it is arranged that when the flow reaches a predetermined value a switch 19 is operated controlling the current supply circuit.

When the switch is opened, cutting off the current, the removal of metal ceases. In this way workpieces may be produced having substantially identical coefficients of discharge. Where several workpieces are machined simultaneously a separate flowmeter and control circuit is of course provided for each workpiece.

Also, where the process is used to machine a number of holes simultaneously, and consequently a corresponding number of flowmeters is required, these flowmeters can be calibrated or set-up to operate switches 19 at identical flow values, by connecting the flowmeters in series. In this way, under steady flow conditions, the flow through each flowmeter must be identical. The flowmeters are connected in parallel during the machining operation.

Referring now to the embodiment of FIG. 3, electrolyte at constant pressure is fed from a header tank 30 through pipes 31a and 31b to chambers 13A, 13B. One compartment 13A contains both a workpiece 14 having a hole 15 to be finished and also the machining tool 18, the arrangement being similar to that shown in FIG. 2. The other compartment contains a reference member 34 having a calibrated reference hole 35 providing the desired flow value, and also a dummy electrode 38 to ensure similarity of flow coefficient.

The pipe 31a supplies electrolyte to the workpiece 14 to be finished and the pipe 31b supplies electrolyte to the reference member 34. It will be apparent that the holes 15, 35 are in parallel, the upstream pressure being common to the two and the downstream pressure also being common. Thus the pressure difference across hole 15 is equal to that across hole 35. The electrolyte flowing through the holes 15 and 35 is received in the bottom tank 36 from where it is fed by the pump 37 and the feed pipe 43 to maintain a constant pressure head in the tank 30, which is achieved by means of an overflow pipe 39 extending between the header tank 30 and the bottom tank 36. Identical flowmeters 40a, 40b in pipes 31a, 31b, measure the flows through the two holes 15, 35, and the outputs are fed to a comparator 41 which switches off the direct current supply 42 to the tool 18 and workpiece 14 when the flow through meter 40a becomes equal to that through meter 40b.

In operation, a direct current is caused to flow between the workpiece 14 and the tool 18 so that metal is electrolytically removed from the workpiece, enlarging the effective flow area of the hole 15, and thus allowing the rate of flow of electrolyte through the hole to increase. As the rate of flow increases, the electrical output from flowmeter 40a increases correspondingly, until it becomes equal to that from flowmeter 40b when the comparator output, through a relay or other suitable means, operates to cut off the current supply 42 and terminate the electrolytic machining operation.

When it is desired to machine holes in several workpieces simultaneously, a flowmeter 40a, a comparator 41 and a suitable switching device in the power supply, are associated with each workpiece in order to detect when the flow through each hole being finished is equal to the flow through the master hole 35 in the reference member, and thus terminate the machining operation on each workpiece at the appropriate instant. In this way a large number of workpieces can be machined simultaneously so that the holes have the same discharge coefficient as the hole in the reference member.

Instead of maintaining the pressure constant and sensing the change of flow resulting from the increased flow area as the hole is machined, the flow may be maintained constant and the change of pressure difference resulting from the increased flow area may be sensed. In this case, where a hole being machined is to be compared with a reference hole, the two are conveniently arranged in flow series, when the flow through the two will be the same. Machining will then be terminated when equality, or a predetermined ratio, of the two pressure differences is sensed, and variations in the absolute value of the flow are relatively unimportant.

Referring to FIG. 4, a flow of electrolyte is supplied from a header tank 50 through pipe 51 to a chamber 53, in which a reference member 54 formed with a calibrated hole 55 is positioned. Downstream of hole 55 the electrolyte is led in a closed pipe 56 to a chamber 13 in which the workpiece 14 is positioned, the workpiece having been initially formed with a hole 15 which is to be completed to give desired flow characteristics (conveniently the same flow characteristics as hole 55). Downstream of hole 15 the electrolyte is led away to a suitable sink 57, from which it may be recovered, if desired, and pumped up to tank 50.

It will be evident that the rate of flow through hole 15 is equal to that through hole 55. A tool 18 is positioned in relation to hole 15 and an electric supply connected to tool 18 and workpiece 14 as above described. A dummy tool 58 is positioned in the same relation to hole 55 to give similarity of flow, though of course no electric supply is needed for tool 58.

A suitable device 59 such as a diaphragm or differential pressure capsule device senses the pressure drop across hole 55, and conveniently is arranged to have an electrical output proportional to the pressure drop, which is led to a comparator 60. A similar device 61 senses the pressure drop across hole 15 and its output is fed to the comparator. The output of the latter is connected to operate a switch 62 in the current supply to the tool 18.

When the pressure drop across hole 15 falls, as a result of the increase in effective area due to the electrolytic removal of metal from around the hole, to a value equal to that across hole 55, the comparator senses the equality and operates the switch 62 to terminate the machining operation.

It would be possible to arrange for machining to be terminated with the hole in the workpiece bearing another predetermined relation to the calibrated hole 55 in the reference member, for example by arranging for a different electrical output from the differential-pressure-sensing device 59 for a given pressure drop.

The temperature and composition of the electrolyte may be controlled in any known or convenient manner to maintain the viscosity of the electrolyte constant.

It will be appreciated that, particularly in arrangements such as FIG. 1 where no reference hole is employed, the accuracy with which holes of the required flow characteristics can be produced depends on the accuracy to which the electrolyte pressure difference (or flow) and viscosity are maintained, and also on the accuracy of the means for measuring or sensing the rate of flow of electrolyte through (or pressure difference across) the hole. It is envisaged that the initial hole will be made only slightly undersize, and only a small amount of metal removed in the process described.

Apart from its use in connection with fuel injection nozzles, the invention could also be used in the finishing or calibration of carburettor jets, gas turbine burners, gas burners and paint spraying jets.

I claim:

1. Electrochemical machining apparatus for producing a hole having required flow characteristics in a metallic workpiece, including means to support a tool and workpiece in positional relation with the tool opposite a hole initially formed through the workpiece, means to supply an electrolyte to the gap between the tool and the workpiece, so as to cause the electrolyte to flow through the hole through the workpiece, means to pass a current through the electrolyte between the tool and the workpiece whereby electrolytically to remove metal from around the hole through said workpiece, sensing means to sense a variable, selected from the group comprising the rate of flow of electrolyte through the hole, and the pressure difference across the hole, and comparator means to automatically compare the value of said variable with a reference value, and means to terminate said passing of current when the value of said variable is in predetermined relation to said reference value.

2. Apparatus as claimed in claim 1, wherein said supply means is operable to supply electrolyte to the gap at a controlled pressure, whereby the flow of electrolyte through the hole in the workpiece at a given pressure difference across the hole will be increased as the hole is effectively enlarged, said sensing means is operable to sense the rate of flow of electrolyte through the hole, said comparator means is operable automatically to compare the value of said rate of flow with a reference value of rate of flow, and comprising means to terminate said passing of current when the value of the rate of flow of electrolyte through the hole in the workpiece is equal to the reference value of the rate of flow.

3. Apparatus as claimed in claim 1, including means to cause the electrolyte to flow through the hole at a controlled rate, whereby the pressure difference across the hole for a given flow rate will be decreased as the hole is enlarged, said sensing means being adapted to sense the pressure difference across the hole, said comparator means being operable automatically to compare the value of said pressure difference across the hole in the workpiece with a reference value of pressure difference and comprising means to terminate said passing of current when the pressure difference across the hole in the workpiece is equal to the reference value of the pressure difference.

4. Apparatus as claimed in claim 1 including a reference member formed with a reference hole therethrough, and means to cause the electrolyte to flow through the reference hole while subjecting said reference hole to the same pressure drop as the hole in the workpiece, and wherein said variable is the rate of flow of electrolyte through the hole through said workpiece and said reference value is the rate of flow of electrolyte through said reference hole.

5. Apparatus as claimed in claim 1 including a reference member formed with a reference hole therethrough, and means to cause electrolyte to pass through said reference hole at the same rate of flow that it passes through the hole in said workpiece, and wherein said variable is the pressure difference in said electrolyte across the hole through said workpiece and said reference value is the pressure difference in said electrolyte across said reference hole.

6. Apparatus as claimed in claim 1, adapted to produce a hole having required flow characteristics in each of a plurality of workpieces, including a said sensing means and a said comparator means operatively connected to each of said plurality of workpieces, and a plurality of means to terminate the passing of current to each of said workpieces, when the value of said variable corresponding to the appropriate workpiece is in predetermined relation to said reference value.

7. Apparatus as claimed in claim 4, wherein the supply means comprises a common source of electrolyte, and wherein first and second electrolyte paths, arranged in parallel, are connected to the common source and exhausted to a common pressure, the first path including the hole through the workpiece and a first flowmeter disposed between the source and hole, and the second path including the reference hole and a second flowmeter disposed between the source and reference hole, said comparator being connected to the outputs of the first and second flowmeters and to the means to terminate said passing of current to actuate the latter to cut off the current when the rates of flow sensed by the first and second flowmeters are equal.

8. Apparatus as claimed in claim 5, wherein the supply means comprises a common source of electrolyte, and wherein first and second electrolyte paths are connected, in series, to said source, the first path including the hole through the workpiece and a first device to sense the pressure drop across the hole, and the second path including the reference hole and a second device to sense the pressure drop across the reference hole, said comparator being connected to the outputs of the first and second sensing devices and to the means to terminate said passing of current to actuate the latter to cut off the current when the pressure drops sensed by the first and second devices are equal.

9. A method of imparting required flow characteristics to a hole in a metallic workpiece, including the steps of passing a flow of liquid electrolyte through the hole and simultaneously removing metal electrolytically from the workpiece by passing a current through the electrolyte between a tool and the workpiece to enlarge the effective flow area through the hole, automatically sensing a variable, selected from the group comprising the rate of flow of electrolyte through the hole, and the pressure differential across the hole, automatically comparing the value of said variable with a reference value, and terminating said passing of current when the value of said variable is in predetermined relation to said reference value.

10. A method as claimed in claim 9, which includes passing the flow of liquid electrolyte at a controlled pressure through the hole, passing a direct current between the tool and the workpiece, whereby the flow of electrolyte through the hole in the workpiece at a given pressure difference across the hole increases as the hole is effectively enlarged, sensing the rate of flow of electrolyte through the hole, comparing the value of said rate of flow with a reference rate of flow, and terminating said passing of current when the value of the rate of flow of electrolyte through the hole in the workpiece is equal to the reference value of the rate of flow.

11. A method as claimed in claim 9, which includes passing the flow of electrolyte at a controlled flow rate through the hole, passing a direct current between the tool and workpiece, whereby the pressure differential across the hole decreases at a given flow rate as the hole is enlarged, sensing the pressure differential across the hole, comparing the value of said pressure difference across the hole in the workpiece with a reference value of pressure difference and terminating said passing of current when the pressure difference across the hole in the workpiece is equal to the reference value of the pressure difference.

12. A method as claimed in claim 9, including additionally causing the electrolyte to flow through a reference hole in a reference member which is not subjected to the electrolytic removal of metal whilst the electrolyte is caused to flow through a hole in the workpiece, comparing the variable of the electrolyte which flows through the hole in the workpiece and the same variable of the electrolyte which flows through the reference hole, and interrupting the current to terminate removal of metal from around the hole in the workpiece when the values of the variables are in a predetermined relation.

13. A method as claimed in claim 9, which includes simultaneously machining a plurality of workpieces, individually sensing the variable of the electrolyte flowing through each workpiece hole, comparing it with the reference value of said variable, and terminating the passing of current to each of said workpieces when the value of said variable corresponding to the appropriate workpiece is in predetermined relationship to said reference value, whereby a large number of holes may be machined simultaneously so as finally to have the same flow number or discharge coefficient as the calibrated hole in the reference member.

14. A method as claimed in claim 12, which includes directing the electrolyte along parallel paths respectively including the workpiece hole and reference hole, whilst maintaining the pressure of the electrolyte in both paths the same, sensing and comparing the rates of flow of the electrolyte through the reference hole and workpiece hole, and exhausting the electrolyte to atmospheric pressure after flowing through said holes.

15. A method as claimed in claim 12, which includes directing the electrolyte at a constant flow rate along a series path, first through the reference hole, then through the workpiece hole, sensing and comparing the pressure differentials across the reference hole and workpiece hole, and exhausting the electrolyte to atmospheric pressure.

16. A method as claimed in claim 9, which includes controlling the temperature and composition of the electrolyte in order to maintain the viscosity of the electrolyte substantially constant.

References Cited

UNITED STATES PATENTS

| | | | |
|---|---|---|---|
| 3,365,381 | 1/1968 | Fromson | 204—229 X |
| 3,433,728 | 3/1969 | Petroff | 204—228 X |
| 3,630,877 | 12/1971 | Koike et al. | 204—229 X |
| 3,637,481 | 1/1972 | Williams | 204—143 M X |

JOHN H. MACK, Primary Examiner

D. R. VALENTINE, Assistant Examiner

U.S. Cl. X.R.

204—224 M, 229